United States Patent [19]
Koester et al.

[11] Patent Number: 5,717,548
[45] Date of Patent: Feb. 10, 1998

[54] VOICE COIL ACTUATED BI-STABLE LATCH ASSEMBLY

[75] Inventors: David Douglas Koester, Chauhassen, Mich.; William Joseph Kostecka, Jordan, Minn.

[73] Assignee: Seagate Technology, Inc., Scotts Valley, Calif.

[21] Appl. No.: 610,270

[22] Filed: Mar. 4, 1996

[51] Int. Cl.⁶ .............................. G11B 5/54; G11B 21/22
[52] U.S. Cl. ................................................. 360/105
[58] Field of Search ............................................. 360/105

[56] References Cited

U.S. PATENT DOCUMENTS

| | | | |
|---|---|---|---|
| 4,562,500 | 12/1985 | Bygdnes | 360/105 |
| 4,692,829 | 9/1987 | Campbell | 360/105 |
| 4,881,139 | 11/1989 | Hazebrouck | 360/105 |
| 4,903,157 | 2/1990 | Malek | 360/105 |
| 5,023,736 | 6/1991 | Kelsic et al. | 360/105 |
| 5,025,437 | 6/1991 | Yamashita et al. | 360/79 |
| 5,034,837 | 7/1991 | Schmitz | 360/105 |
| 5,043,834 | 8/1991 | Kubo et al. | 360/105 |
| 5,095,395 | 3/1992 | Wakatsuki | 360/105 |
| 5,162,959 | 11/1992 | Arin et al. | 360/105 |
| 5,170,300 | 12/1992 | Stefansky | 360/105 |
| 5,208,713 | 5/1993 | Lindsay et al. | 360/105 |
| 5,216,662 | 6/1993 | Stefansky et al. | 369/215 |
| 5,231,556 | 7/1993 | Blanks | 360/105 |
| 5,303,101 | 4/1994 | Hatch et al. | 360/105 |
| 5,313,350 | 5/1994 | Dion | 360/97.01 |
| 5,341,259 | 8/1994 | Amirkiai et al. | 360/105 |
| 5,381,290 | 1/1995 | Cheng | 360/105 |

*Primary Examiner*—John H. Wolff
*Attorney, Agent, or Firm*—Flehr Hohbach Test Albritton & Herbert LLP

[57] ABSTRACT

A bistable latch assembly is disclosed which includes a latch lever supported on a pivot pin adjacent the rotating discs and the actuator arm, and rotatable between two stable positions defined at the opposite end of the lever from the pivot pin by a pair of stop pins. The latch lever includes a magnet movable between these two stop pins, the attraction of the magnet to the pins defining the two stable positions for the lever. An edge of the lever facing the disc includes a notch which captures a pin extending from the actuator arm. When the latch lever engages the actuator arm pin in the notch, then the magnet of the latch lever is held by magnetic attraction against one of the stop pins. When the actuator arm is to be put to use in the disc drive, the voice coil motor is actuated, and has sufficient power to cause the stop pin on the actuator arm to disengage from the notch. As the pin slides along an edge of the latch lever, it moves the magnet from one stable position to the other stable position causing the latch lever to rest against the other stop pin.

5 Claims, 2 Drawing Sheets

Locked

Unlocked

VOICE COIL ACTUATED BI-STABLE LATCH ASSEMBLY

FIELD OF THE INVENTION

This invention is directed generally to a latch assembly for use in a hard disc drive, and more particularly to one which is designed to avoid applying bias or other force to the actuator arm of the disc drive when the latch is not actuated.

BACKGROUND OF THE INVENTION

In a fixed hard disc drive, such as is common in personal computers, the disc drive actuator and recording heads must be restrained by a latch from sudden movements when the disc drive is powered down in order to prevent damage to the disc recording media. This is a particular problem in drives using a voice coil motor; when the disc drive is powered down, there is no force which will prevent the recording heads from moving out of the landing zone and into the areas of the recording media where data is stored, and hitting the disc surface which could potentially cause data loss. The same latch system should be able to lock the actuator arm in place when the product is being shipped to the customers, resisting rotational and linear shocks that may occur.

In the past, many disc drive actuator arms were held in place by a physical lock which prevented movement when the drive was out of use and during shipment. The problem with such a physical lock is that it can fail in the locked position and prevent further use of the disc drive until repaired. Also, a physical lock requires its own power source which increases power demand and generates heat within the disc drive.

A number of alternative designs have been introduced based on magnetic biasing or magnetic actuation. These earlier designs utilized a bistable solenoid; however, such designs cannot be adjusted, are relatively complex, and require provision of extra electrical connections. They also create metal to metal contact, which could generate highly undesirable metal particles inside the atmosphere of the head disc assembly.

A common design approach is a magnetic latch, but such designs have a number of deficiencies. They cannot be adjusted, have a relatively low holding force, have no restoring force, apply unwanted bias to the actuator, and are typically quite complex in design. Many create metal to metal contact, and require machining of some features.

A number of wind vane driven latches have been designed and incorporated into products. However, their holding force is relatively low, as is their restoring force.

Inertial latches have also been utilized to hold the actuator arm in a disc drive but they are unable to provide a high holding force with most designs; many also need a separate power supply.

Further, operation of many latch devices is position dependant; thus the orientation of the disc drive could effect the reliability of the latch device.

SUMMARY OF THE INVENTION

It is therefore an object of the present invention to provide a latch mechanism which consumes no power during operation, and therefore does not dissipate any heat within the disc drive.

A further object of the present invention is to provide a latch mechanism which operates reliably regardless of the orientation of the disc drive, which provides a high holding force so that the actuator arm does not become free to move in the event of imposition of any shock, and provides adequate restoring force so that the latch is reliably restored to a non-operating position awaiting the next time when it is needed to engage and capture the actuator arm.

Another object of the present invention is to provide a latch assembly wherein there is no metal to metal contact that could generate magnetic particles; such particles could eventually cause data loss or erasure.

Another object of the present invention is to provide a design which is compatible with typical drive electronics, and requires no special electrical components on the PCB to enable its operation.

Another object of the present invention is to provide a latch mechanism which does not need to add any additional machined features incorporated on the pivot housing.

A further object of the present invention is to provide a latch mechanism which has the fewest possible moving parts so that its design is simple, yet reliable in holding the actuator arm.

Another objective of the present invention is to provide a design which does not require adjustment because of the tight tolerances incorporated in the system, and does not have a high bias in a non-operating position which must be overcome in order to actuate the latch.

These and other objectives of the present invention are achieved by a bistable latch assembly which includes a latch lever supported on a pivot pin adjacent the rotating discs and the actuator arm, and rotatable between two stable positions defined at the opposite end of the lever from the pivot pin by a pair of stop pins. The latch lever includes a magnet movable between these two stop pins, the attraction of the magnet to the pins defining the two stable positions for the lever. An edge of the lever facing the disc includes a notch which captures a pin extending from the actuator arm. When the latch lever engages the actuator arm pin in the notch, then the magnet of the latch lever is held by magnetic attraction against one of the stop pins. When the actuator arm is to be put to use in the disc drive, the voice coil motor is actuated, and has sufficient power to cause the stop pin on the actuator arm to disengage from the notch. As the pin slides along an edge of the latch lever, it moves the magnet from one stable position to the other stable position causing the latch lever to rest against the other stop pin.

Thus, the latch reliably achieves its goal of latching the actuator arm and the transducer it supports in a landing zone of the disc while the drive is powered off. It is resistant to rotational and linear shocks that may occur in shipping the product to the customer as well as when the drive is installed in a user's system, because of the engagement between the actuator arm stop pin and the latch lever notch, as well as the attraction of the magnet to the stop pin.

The latch lever is held in its two stable positions by magnetic force; thus the latch assembly does not apply any magnetic force to the actuator that could potentially affect positioning accuracy when the actuator arm is in use. The size of the notch engaging the stop pin on the arm also provides the actuator arm some degree of looseness during spin up and spin down, allowing the heads to take off and land in slightly different locations on the disc to reduce wear. The assembly requires no fasteners, or fine adjustments to accurately position the lever adjacent the drive, making assembly of the lever into the disc drive very simple and reliable.

DESCRIPTION OF A PREFERRED EMBODIMENT

Figure 1:
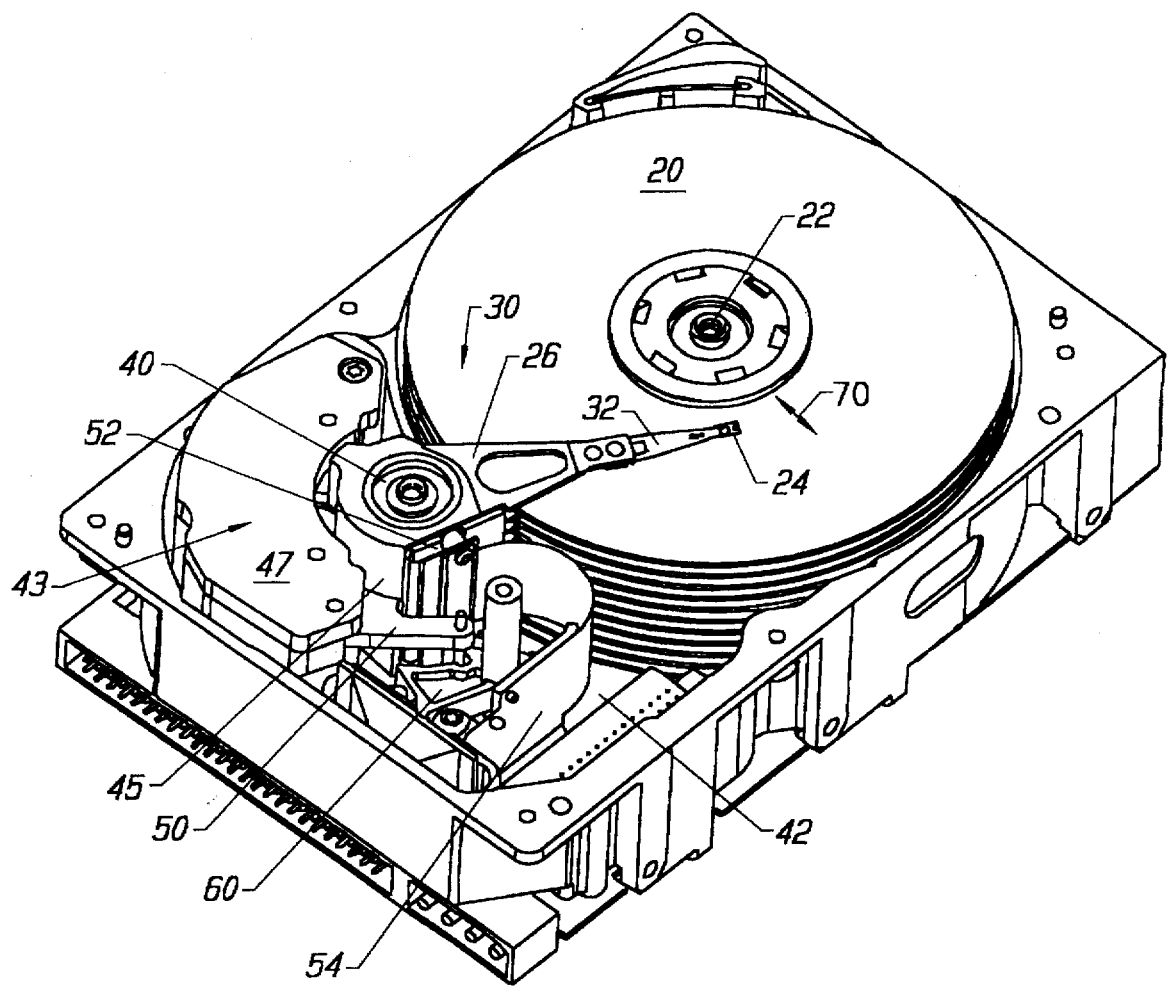
FIG. 1 is a perspective view of the present bistable latch assembly incorporated in a typical disc drive.
Figure 2:
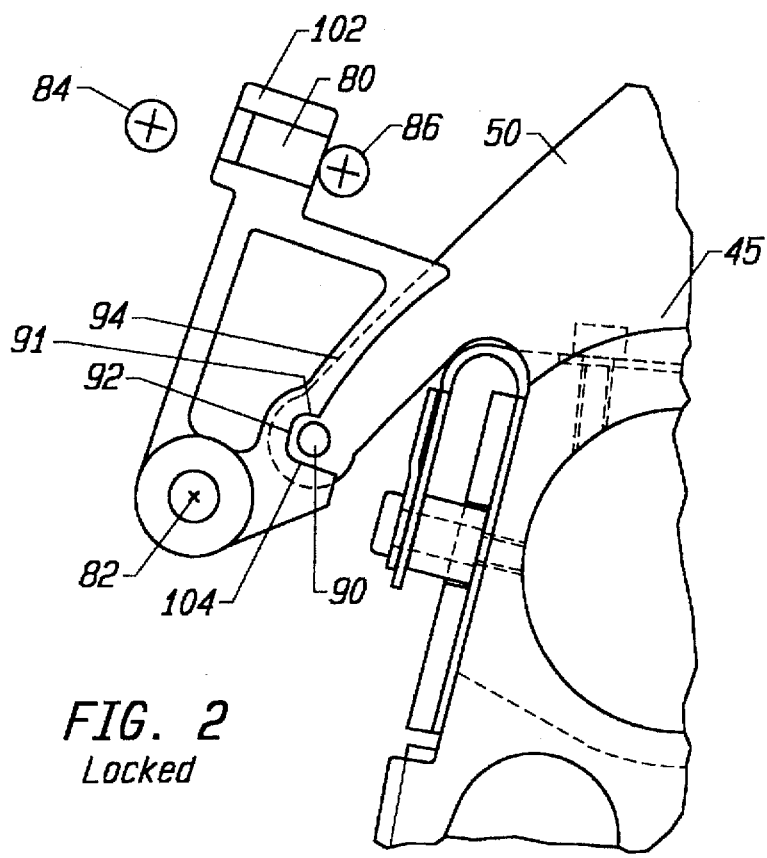
FIG. 2 is a top broken-way view of the present invention showing particular details thereof and showing the latch in the actuated position.
Figure 3:
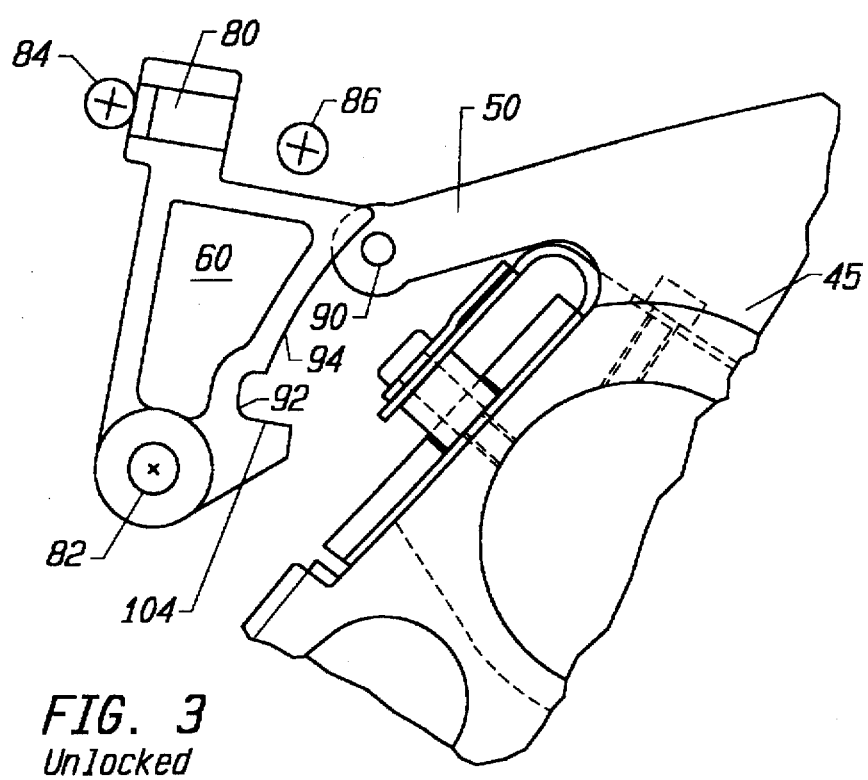
FIG. 3 is a top view in partial section of the present latch shown in the second stable position where the latch is deactivated.

An exemplary embodiment of the present invention will be shown and described herein with respect to FIGS. 1–3. The particular disc drive shown herein includes a hard disc assembly incorporating various numbers of hard discs and utilizing Winchester technology; however, the disc drive of the present invention may utilize other types of discs, for example optical discs, and other read/write technology, for example, lasers.

The diameter of the discs in the present disc drive shown as an operating example are so-called "3.5 inch" discs; however, the latch of the present invention can be used with any diameter disc, whether larger or smaller than this typical size.

A disc drive in which the present invention is useful is shown in FIG. 1, and includes a plurality of discs 20, mounted on a common spindle 22 for rotation by a spindle motor of a type which is well-known in this technology and is not shown in the drawings. The hard discs record data on circular tracks on each surface, with the data tracks being accessed by a transducer 24 mounted on an actuator arm 26 of a known and well established design which is not further disclosed herein.

As noted, the purpose of the actuator assembly generally indicated at 30 is to position transducers 24 with respect to any track on each surface of the discs 20 on which data may be recorded by pivoting one of the arms 26 over the surface. Each arm 26 includes a flexure 32 for supporting the transducer. The arm assembly including the actuator arm 26 and flexure 32 pivots on actuator pivot 40 which is mounted to the base 42. On the opposite side of actuator pivot 40 from the actuator arm 30 is a portion of a voice coil motor, which in this example is a support for the voice coil. The essential elements of the voice coil motor 43 are a coil, a support 45 for the coil which is typically a fork shaped arm supported on the pivot 40 and integrated with the actuator arm 30, and one or two magnets 47 mounted in an overlying relationship with the coil. As currents are supplied to the coil, magnetic forces are created parallel to the plane of the windings in the coil; these cause the arm assembly to move over the surface of the disc to the desired position. It is also possible, of course, to produce voice coil motors wherein the parts are reversed. That is, that the magnet is supported on a portion of the actuator arm to the rear of the pivot and coils are supported above and below the magnet to interact with the magnet and cause positioning of the arm.

The present latch is especially useful and desirable to cooperate with any actuator arm driven by a voice coil type motor which does not inherently incorporate a detent locking force to hold the arm in place. What such designs have in common according to this invention is a locking arm 50 extending laterally to the side of the actuator arm 30 and movable with the actuator arm. The angle of the locking arm with the actuator arm is sufficient to provide clearance around the cable connections 52 for the PCC 54 which carries signals to and from the voice coil motor and the transducer of the actuator arm; and the angle of the locking arm with the actuator arm is also sufficient to achieve a proper working angle relationship with the latching lever 60. The further details of the interrelationship between this locking arm which is fixably attached to the actuator arm and the bistable latch lever 60 which is mounted to the same side of the actuator arm will now be described with reference to FIGS. 2 and 3.

As already described above, the purpose of the latch is to hold the transducer heads 24 supported by the actuator assembly arm 30 in the landing zone (70, FIG. 1) on the surface of the disc 20 while the drive is powered off. The latch must be physically strong enough to consistently resist the rotational and linear shocks that may occur. As can be seen in FIGS. 2 and 3, the latch has a locked (FIG. 2) and unlocked (FIG. 3) position, and is held in these two stable positions by magnetic force. The magnet 80 which is mounted at the far or distal end of the latch lever 60 from the pivot pin 82 is moved between two stable positions defined by combined magnetic targets and positional stops 84, 86 by the voice coil motor driven actuator. The only contact between the actuator arm 50 and the latch lever 60 is the stop pin 90 which is engaged in the notch 92 to lock the actuator arm in place (FIG. 2). When the actuator arm 50 is to be disengaged from latch lever 60 and left free to rotate, the voice coil motor is driven in a direction which moves the transducer away from landing zone 70. This causes the pin 90 to press against the side of the notch 92 moving the magnet 80 away from its stable position against stop pin 86. The pin 90 slides along arc 94 on the side of the latch lever facing the actuator arm, moving the latch lever from the stable position shown in FIG. 2 to the stable position shown in FIG. 3.

It is significant to note that the single magnet 80 is supported in the end region 102 of the latch lever most distant from the pivot pin 82, and is magnetically charged along the axis running between the positional stop pins 84, 86. The magnet positively engages one or the other of the positional stop pins 84, 86 at all times when it is not in motion between stable positions. Thus so that the lever 60 occupies either a first stable position holding the actuator arm against movement, or a second stable position allowing the actuator arm 30 to rotate freely in response to energization of the voice coil motor. The magnet 80 is purposely not centered in the end region 102 which is a preferred embodiment of the invention; in this way, a higher attractive force is established when the lever is in the locking position shown in FIG. 2 so that the actuator arm is firmly held against disengagement. That is, when the actuator arm is to be freed to move, the voice coil motor moves pin 90 along arc 94 of lever 60 with sufficient speed that the lever 60 gains momentum in the counterclockwise direction and moves into contact with pin 84 even though pin 90 ends its contact with arc 94.

In the other stable position, resting against the stop pin 84, the actuator arm is free to move and the stop pin 90, having cammed the latch lever over to establish engagement between the magnetic stop 84 and the magnet 80, is essentially out of contact with the camming surface 94 and the remainder of the lever 60. The force holding the magnet 80 attracted to the positional magnetic stop 84 is lower in this stable operating position than in the first described stable locking position; this facilitates moving the latch lever back into its locking position when the actuator arm and lever 50 move far enough counterclockwise to cause the pin 90 to engage the forward lock engagement surface 104 of the notch 92, pushing the latch lever 60 in a clockwise direction until the magnet 80 contacts the stop pin 86.

It can be seen from this description that the stop pin 90 supported on the actuator arm housing and preferably extending from the side of the pivot housing, provides the only interface between the latch assembly and the actuator. Therefore, the latch lever 60 does not interfere in any way nor provide an undesirable bias against the actuator arm when the actuator arm is to be left free to operate.

It should further be noted that the length of the arc 94 on the side of the latch lever 60 used to cam the lever 60 into the non-operating position provides a fail-safe that prevents the latch from accidentally locking during operation. The three steel pins 82, 84, and 86 which provide the pivot 82 and the stops 84, 86 are easily incorporated into disc drive design, being pressed into the deck casting in a preferred approach to the design. Because of the distance of the magnet 80 from the voice coil motor and actuator arm as it rotates between the stop pins 84 and 86, the latch assembly does not apply any magnetic bias against the actuator that could effect positioning accuracy.

The size of the engagement locking notch 92 also provides the actuator arm with some degree of looseness during spin up and spin down that allows the heads to take off and land in slightly different locations on the disc to reduce wear.

A number of further advantages are realized from this design. The restoring force of the magnet makes it insensitive to short pulse events. Even if a shock pulse is of high enough amplitude to move the magnet away from the stop pin 84 or 86, the magnetic force will return the lever to the locked position. It has further been found that this design provides a higher holding force than a simple magnetic latch. Because there is no magnetic bias effects against the actuator arm, the magnet 80 can be of considerable strength, resulting in higher holding forces than previously achieved. This provides significantly less susceptibility to unlocking due to shock pulses.

Finally, there is no adjustment or hardware required in the assembly. The latch lever is simply dropped over the pivot pin, falling easily into place beside the actuator arm and being automatically aligned between the two positional stops 84 and 86. As noted, the notch does not have to be of a size having closely limited tolerances allowing for a simple approach to assembly. By making the pivot pin 82 and stop pins 84, 86 of substantially the height of the space between the base 42 and the top cover (notch home) the entire latch design is constrained in position by the upper and lower castings so that no height tolerances need to be established. The lever position relative to the stop pins utilizes component tolerances which are defined so no adjustment during drive assembly will be required.

Other features and advantages of the present invention will be apparent to a person of skill in the art who studies the above description. Further, alterations in the above design may become apparent to a person of skill in this field who studies this disclosure. Therefore, the scope of the present invention is to be limited only by the following claims.

We claim:

1. In a disc drive having at least one disc journaled for rotation about a common central spindle axis, and an actuator arm supporting a transducer at or near one end for movement over a surface of said disc for accessing data on tracks on said disc and a portion of a voice coil motor at a second end, said actuator arm being supported on a pivot adjacent said discs, a voice coil actuated bistable latch comprising a locking arm extending from said actuator arm and supporting a stop pin which cooperates with a latch lever moveable between first and second stable positions defined by positional stop pins, to prevent movement of said actuator arm in response to shock, said latch lever being supported for rotation at one end by a pivot pin, a base of said disc drive supporting said first and second positional stop pins defining an arc of rotation of said latch lever as said actuator arm is latched and unlatched, an end region of said latch lever sufficiently distant from said pivot pin to rotate between and respectively contact either one of said positional stops including an off-center magnet to achieve a differential attraction between the positional stop pins aligned to contact and hold one or another of said positional stop pins to reinforce bistable positioning of said latch lever;

said first bi-stable position leaving said actuator arm free to move said transducer over said disc surface, said second bi-stable position engaging said latch lever assembly with said stop pin to capture and hold said actuator arm, said movement between said first and second positions being in response to energization of said voice coil motor movement of said actuator arm causing said stop pin to contact said latch lever and rotate around said pivot pin between said first and second stable positions.

2. A bistable latch as claimed in claim 1 wherein said actuator arm comprises a locking arm extending laterally from said actuator arm and supporting said pin so that said latch lever can engage said pin to capture and hold said arm.

3. A bistable latch as claimed in claim 1 wherein said second of positional stop pins is located at an end of said arc closer to said actuator arm to define said second stable position, and said first of said stop pins is located at another and of said arc further from said actuator arm to define said first stable position wherein said actuator arm is free to move.

4. A bistable latch as claimed in claim 3 wherein said pivot pin is of sufficient height to be constrained by a top cover of said disc drive.

5. A bistable latch as claimed in claim 1 wherein a side of said latch lever extending from near said pivot pin toward said and region defines an arc, said stop pin sliding along said arc, with movement of said actuator arm to move said actuator arm between said first and said stable positions.

* * * * *

UNITED STATES PATENT AND TRADEMARK OFFICE
CERTIFICATE OF CORRECTION

PATENT NO. : 5,717,548
DATED : February 10, 1998
INVENTOR(S) : KOESTER et al.

It is certified that error appears in the above-indentified patent and that said Letters Patent is hereby corrected as shown below:

On the cover sheet, under [75] Inventors, immediately following "Koester," delete "Mich." and insert therefor --Minn.--.

On the cover sheet, under [56] References Cited, U.S. PATENT DOCUMENTS, insert --5,112,318   5/1992   Novacek et al.--.

Column 6, line 31, claim 1, immediately following "motor" insert --;--.

Column 6, line 43, claim 3, delete "are" and insert therefor --arc--.

Column 6, line 51, claim 5, delete "and" and insert therefor --end--.

Signed and Sealed this

Twenty-seventh Day of October, 1998

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,717,548
DATED : February 10, 1998
INVENTOR(S) : Koester et al.

It is certified that error appears in the above-identified patent and that said Letters Patent is hereby corrected as shown below:

On title page, item [75], line 1, following "David Douglas Koester", delete [Chauhassen] and insert
-- Chanhassen --.

Signed and Sealed this

Second Day of February, 1999

Attest:

Attesting Officer

*Acting Commissioner of Patents and Trademarks*